Oct. 23, 1973  P. K. BALTZER  3,767,581
RADIATION RESISTANT LITHIUM FERRITE CORES
Filed May 31, 1967
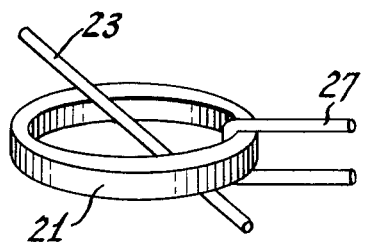
INVENTOR
PHILIP K. BALTZER
BY
ATTORNEY

United States Patent Office

3,767,581
Patented Oct. 23, 1973

3,767,581
RADIATION RESISTANT LITHIUM FERRITE CORES
Philip K. Baltzer, Princeton, N.J., assignor to RCA Corporation
Filed May 31, 1967, Ser. No. 642,428
Int. Cl. C04b 35/26
U.S. Cl. 252—62.61                                       5 Claims

ABSTRACT OF THE DISCLOSURE

A neutron radiation resistant ferrite core comprises a ferrite which contains lithium isotopically enriched in $^7Li$, and one or more of manganese, cobalt, or elements which decay under alpha particle bombardment to manganese or cobalt.

BACKGROUND OF THE INVENTION

This invention relates to ferrite cores having an improved resistance to neutron bombardment and containing lithium as one of its constituents. It particularly relates to ferrite cores containing lithium wherein the lithium is isotopically enriched in the isotope $^7Li$. Such ferrites are hereinafter termed lithium ferrites. The term "core" refers to a sintered mass of ferrite particles.

Lithium ferrites are widely used in switching circuits and as memory cores in computers. Memory cores comprised of lithium ferrites generally have good square loop properties, good temperature stability, high switching speeds and other desirable magnetic properties.

It has been found that neutron bombardment adversely affects the magnetic properties of many lithium ferrite memory cores.

The greatest adverse effect on the magnetic properties of lithium ferrite cores takes place in cores which contain a constituent having an isotope which decays under alpha particle bombardment to or from a manganese or cobalt ion. These latter ions strongly influence the magnetic properties of the ferrite cores as they contribute greatly to the degree of anisotropy. Atoms having strong interactions with alpha particles and which decay to or from manganese or cobalt include vanadium, manganese and cobalt. For example, manganese has an isotope $^{55}Mn$ which reacts with an alpha particle to give cobalt according to the notation $^{55}Mn\ (\alpha,n)^{58}Co$. The cobalt ions strongly influence the magnetic properties of the ferrites and thereby may degrade them.

The useable life of such memory cores in environments having high neutron flux density is limited due to this adverse effect. With the advent of space travel and atomic power, where it may be necessary to operate a computer in the vicinity of a high neutron flux, the aforementioned limitation on the life of the memory core can be an important factor with respect to the usefulness and life of the computer.

SUMMARY OF THE INVENTION

The novel lithium ferrite cores are characterized in that the lithium is isotopically enriched in $^7Li$. That is, the isotope of lithium having a gram atomic weight of seven and designated herein as $^7Li$ is substituted for at least a portion of the isotope of lithium having a gram atomic weight of six and designated herein as $^6Li$. Naturally occurring lithium contains about 92.6 percent by weight of the isotope $^7Li$ and about 7.4 percent by weight of the isotope $^6Li$. Cores having greater than the naturally occurring percentage of $^7Li$ are said to be isotopically enriched $^7Li$. It is preferable in the practice of this invention that at least 97 percent of the lithium contained in the lithium ferrite core be $^7Li$.

Square loop ferrite cores comprised of the naturally occurring ratio of $^7Li$ to $^6Li$ and having the composition of $Li_{0.5}Fe_{2.45}Mn_{0.05}O_4$ were found to lose their B-H loop squareness, and thus their usefulness as memory cores, when irradiated with about $10^{19}$ neutrons per centimeter square. Similar cores enriched in $^7Li$ were not adversely affected by a flux of $10^{20}$ neutrons per centimeter square.

In general the invention comprises a lithium ferrite core wherein the ferrite includes at least one material chosen from the group consisting of manganese, cobalt and elements having an isotope which decays under alpha particle bombardment to manganese or cobalt, and wherein the lithium is isotopically enriched in $^7Li$. An example of an element as described above is vanadium.

BRIEF DESCRIPTION OF THE DRAWING

The sole figure is a magnetic core of the invention in the shape of a toroid.

DESCRIPTION OF THE PREFERRED EMBODIMENTS

A preferred embodiment comprises lithium-manganese ferrite cores wherein the lithium is isotopically enriched in $^7Li$. Lithium-manganese ferrite cores generally have good square loop properties and are useful as memory cores in computers. It is desirable in the practice of this invention to make cores wherein at least 97% of the lithium consists of $^7Li$.

Another preferred embodiment is lithium ferrite cores containing bath manganese and vanadium. Lithium isotopically enriched in $^7Li$ may be obtained from Oak Ridge National Laboratories, Oak Ridge, Tenn., in the form of a lithium compound, such as $^7LiCO_3$, useful in preparing lithium ferrites.

EXAMPLE

A magnetic core of the invention may be prepared by the following procedure. Mix a batch of the following ingredients:

| Ingredients: | Molar parts |
|---|---|
| $^7Li$, as lithium carbonate enriched in $^7Li$ | 0.5 |
| Mn, as $MnCO_3$ | 0.05 |
| Fe, as $Fe_2O_3$ | 2.45 |

The batch is attrited in ethyl alcohol for about two hours and then dried and screened. The attrited mixture is then calcined for about four hours in air at about 900° C. The calcined batch is attrited in ethyl alcohol for about two hours and then dried. About 3 percent by weight of a suitable organic binder is evenly dispersed through the dried calcined batch. One suitable binder is Flexalyn in methylethyl ketone which is marketed by the Hercules Powder Company, Wilmington, Del. The calcined batch with the binder added is screened through an 80 mesh screen. The screened calcined batch is then pressed into toroidal cores at a pressure of about 8,000 pounds per square inch. The pressed cores are then sintered for about eight hours at about 1120° C., in an atmosphere containing 80 parts by volume of nitrogen gas and one part by volume of oxygen gas. The sintered cores are cooled to about 1,000° C. and annealed for about four hours at this temperature in an oxygen atmosphere. After annealing, the cores are cooled to room temperature in the annealing atmosphere. The methods for preparing lithium ferrite cores are well known in the art and this invention is not limited to any specific formulation or process for the preparation of the ferrite cores. For example, U.S. Pats. Nos. 3,034,987 issued to P. K. Baltzer, 3,146,205 issued to I. J. Hegki and 3,223,641 issued to H. Lessoff et al. describe lithium ferrite cores having various molar compositions and methods for preparing cores of these compositions.

Referring now to the figure, a core 21 made according to the above example is shown. The core 21 is comprised of a lithium ferrite in which the lithium is enriched in $^7$Li. The dimensions of the core are about .030 inch outside diameter, 0.18 inch inside diameter and about .006 inch thick. Also shown in the figure is an input conductor 23 which may be used for applying current to the core, for example, for test purposes. An output conductor 27 is also shown. The input and output conductors 23 and 27 are, in this instance, each a single wire passed through the orifice in the core 21. Other core sizes and configurations are known in the art and this invention is not limited by the shape and size of the core.

While the exact mechanism is not understood, the following theory has been suggested as an aid to understanding the invention. It was found that magnesium-manganese ferrite is substantially resistant to thermal neutron irradiation. It was hypothesized that the combination of lithium and manganese in lithium-manganese ferrite produced the low neutron radiation resistance in these ferrites. The naturally occurring isotope $^6$Li has a strong reaction with thermal neutrons yielding tritium and an alpha particle according to the equation $$^6\text{Li} + ^1n \rightarrow ^3\text{T} + ^4\text{He}$$

It is believed that this alpha particle reacts with the manganese in the ferrite to produce cobalt which causes the change in properties of the ferrite. It is known that the isotope $^7$Li does not react strongly with neutrons. Therefore, the use of lithium isotopically enriched in $^7$Li makes lithium ferrites more resistant to damage by thermal neutrons by reducing the number of alpha particles formed during neutron irradiation.

Examples of nuclear reactions other than the $$^{55}\text{Mn}(\alpha,n)^{58}\text{Co}$$

reaction which are believed can substantially adversely affect the magnetic properties of a lithium ferrite are recited in the following notations:

$$^{59}\text{Co}(\alpha,n)^{62}\text{Cu}; \quad ^{51}\text{V}(\alpha,n)^{54}\text{Mn};$$

and $$^{50}\text{V}(\alpha,n)^{53}\text{Mn}$$

The isotope $^{59}$Co comprises 100 percent of naturally occurring cobalt. The isotope $^{55}$Mn comprises 100 percent of naturally occurring manganese. The isotope $^{51}$V comprises 99.75 percent of naturally occurring vanadium, the remaining 0.25 percent being the isotope $^{50}$V.

Some examples of lithium ferrite included in this invention are: lithium-vanadium ferrites as disclosed in U.S. Pat. No. 3,000,411 issued to D. G. Wickham; lithium manganese ferrites as disclosed in U.S. Pats. 3,223,-641 issued to H. Lessoff et al., 3,034,987 issued to P. K. Baltzer, and 2,549,098 issued to R. H. Hegyi; lithium-cobalt ferrite disclosed in U.S. Pat. No. 2,986,523 issued to C. M. Van Der Burgt et al. These examples are not meant to be exclusive and any lithium ferrite cores containing at least one ion which decays under alpha particle bombardment to or from manganese ion or cobalt ions are included in this invention. Such ferrite cores may in addition to the specified required ions contain other ions as exemplified in the above cited references.

Referring now to the table below, the effect of thermal neutron irradiation on lithium ferrite cores enriched in either $^6$Li or $^7$Li and having the molar formula $$\text{Li}_{0.5}\text{Mn}_{0.05}\text{Fe}_{2.45}\text{O}_4$$

is shown. The cores, which have a 30 mil outside diameter and an 18 mil inside diameter, were tested before and after neutron irradiation. Measurements were made using an ADAR-PI-C tester manufactured by Adar Associates, Lincoln, Mass. The measurements were made under the following drive conditions: a full drive current of 500 milliamperes; a disturbed drive current of 300 milliamperes; a pulse rise time of 0.4 microsecond; and a pulse duration of 1.5 microseconds. The drive current pulse sequence used to test the performance characteristics and the current and voltage waveforms can be found in U.S. Pat. No. 3,039,962 issued to E. G. Fortin.

The parameters determined in these tests are: the undisturbed output voltage, $\mu V_1$, in millivolts; the disturbed output voltage, $dV_2$, in millivolts; the peaking time, $t_p$, in microseconds; the switching time, $t_s$, in microseconds; and the break current, $I_b$, in milliamperes. Each horizontal row of the table gives the average value of six cores treated in a similar manner.

Cores enriched in $^6$Li were prepared from a starting mixture including LiCO$_3$ wherein 95.6% of the lithium content was $^6$Li. Cores enriched in $^7$Li were prepared from a starting mixture which included LiCO$_3$ wherein 99.9% of the lithium was $^7$Li.

| Core enriched in— | Before irradiation | | | | | After irradiation | | | | | Neutron flux (n./cm.²) |
|---|---|---|---|---|---|---|---|---|---|---|---|
| | $\mu V_1$ | $dV_2$ | $t_p$ | $t_s$ | $I_b$ | $\mu V_1$ | $dV_2$ | $t_p$ | $t_s$ | $I_b$ | |
| $^6$Li | 26 | 1.5 | .68 | 1.20 | 347 | 20 | 2 | .68 | 1.18 | 355 | $10^{18}$ |
| $^6$Li | 25 | 1.5+ | .67 | 1.21 | 348 | 25 | 4+ | .57 | 0.96 | 311 | $10^{19}$ |
| $^6$Li | 23 | 1.5+ | .67 | 1.24 | 352 | 29 | 9 | .51 | 0.96 | 257 | $10^{20}$ |
| $^7$Li | 23 | 1.5+ | .66 | 1.23 | 347 | 24 | 2− | .68 | 1.24 | 337 | $10^{18}$ |
| $^7$Li | 25 | 1.5+ | .67 | 1.25 | 343 | 24 | 2− | .65 | 1.18 | 331 | $10^{19}$ |
| $^7$Li | 25 | 1.5+ | .67 | 1.26 | 349 | 23 | 2.5− | .65 | 1.12 | 330 | $10^{20}$ |

The most significant results of these tests is the sharp rise in the disturbed voltage upon neutron irradiation of the $^6$Li cores. It is important in a memory system that the ratio of undisturbed voltage ($\mu V_1$) to disturbed voltage ($dV_2$) in any core be high. Generally, it is preferable that this ratio be greater than about 6:1. Cores having a lower ratio are often considered rejects since, in many memory systems, the sense amplifier may have difficulty in distinguishing between an undisturbed core and a disturbed core when the ratio in the individual core is less than about 6:1. The results tabulated above indicate that cores comprised of $^6$Li ferrite which are irradiated with a thermal neutron flux of $10^{19}$ neutrons/cm.² are not suitable for use while the properties of similar cores comprised of $^7$Li are not substantially degraded even at a flux of $10^{20}$ neutrons/cm.².

It has also been observed that the normally square hysteresis loop of the $^6$Li irradiated cores degenerates at a flux of $10^{19}$ neutrons/cm.² and undergoes an extreme loss of squareness at $10^{20}$ neutrons/cm.². Hence, these cores are not suitable for use at a flux of $10^{19}$ neutrons/cm.². This effect is not observed in the cores comprised of lithium enriched in $^7$Li.

Another adverse effect of neutron irradiation of the $^6$Li cores is that the break currents are significantly reduced. This significant reduction of break current is not observed in the cores comprised of lithium enriched in $^7$Li.

The amount of radiation resistance one obtains is a direct function of the amount of isotopic concentration of $^7$Li. Therefore, the highest resistance is achieved when all the lithium is $^7$Li.

What is claimed is:

1. A neutron radiation resistant ferrite core comprising a lithium ferrite which includes at least one material chosen from the group consisting of manganese, cobalt, and an element having an isotope which reacts with alpha particles to form manganese or cobalt and wherein the lithium is isotopically enriched in the isotope $^7$Li.

2. A neutron radiation resistant ferrite core described in claim 1, wherein said element is vanadium.

3. A neutron radiation resistant ferrite core as described in claim 2, wherein said material includes manganese.

4. A neutron radiation resistant ferrite core as described in claim 3, wherein at least 97% of the lithium consists of the isotope $^7$Li.

5. A neutron radiation resistant ferrite core having the molar formula $Li_{0.5}Mn_{0.05}Fe_{2.45}O_4$, wherein at least 97% of the lithium consists of the isotope $^7$Li.

References Cited
UNITED STATES PATENTS

| | | | |
|---|---|---|---|
| 2,549,089 | 4/1951 | Hegyi | 252—62.61 |
| 3,034,987 | 5/1962 | Baltzer | 252—62.61 X |
| 3,146,205 | 8/1964 | Hegyi | 252—62.61 |
| 3,223,641 | 12/1965 | Lessoff et al. | 252—62.61 |
| 3,372,122 | 3/1968 | Lessoff | 252—62.61 |

CARL D. QUARFORTH, Primary Examiner

F. M. GITTES, Assistant Examiner

U.S. Cl. X.R.

252—301.1 R